Figure 1:
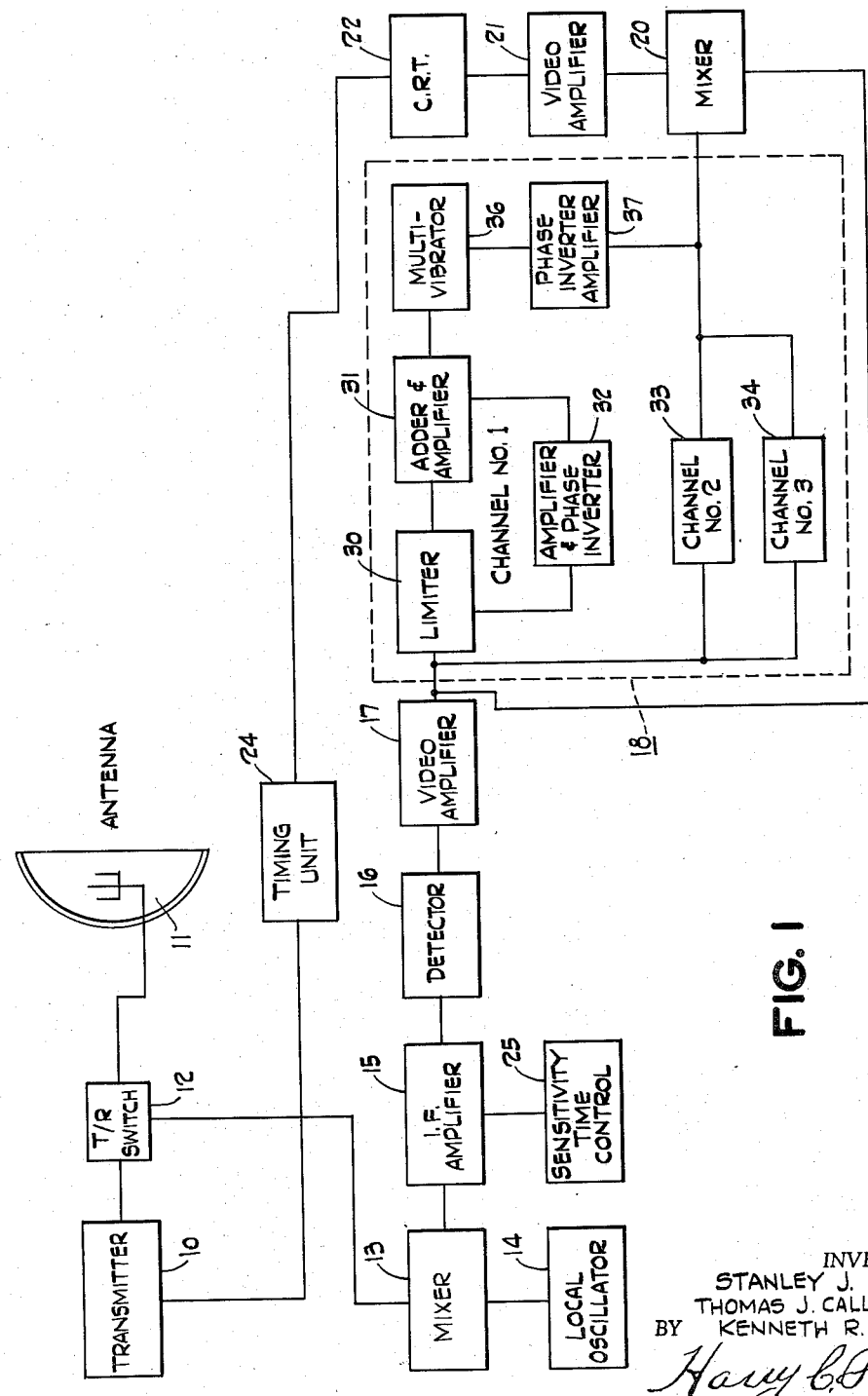

INVENTORS
STANLEY J. OBLOY
THOMAS J. CALLAGHAN
BY  KENNETH R. CUKRAS
ATTORNEY

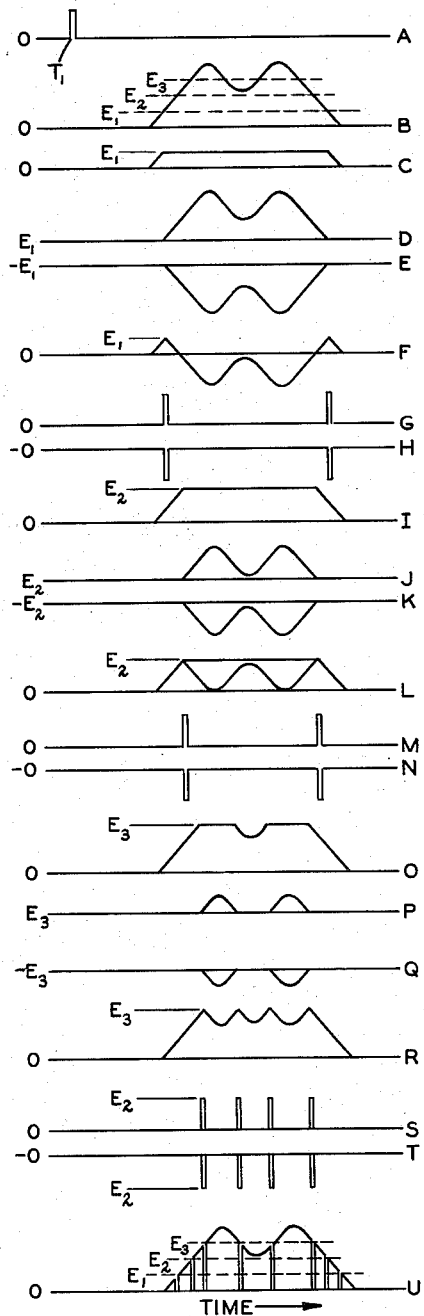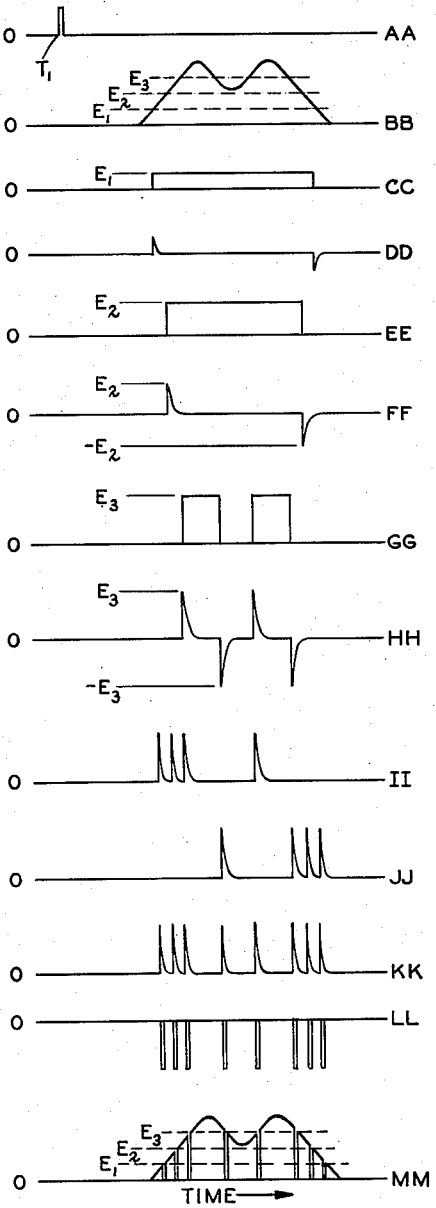
FIG. 3
FIG. 7
INVENTORS.
STANLEY J. OBLOY
THOMAS J. CALLAGHAN
KENNETH R. CUKRAS
BY
*Harry C. Page*
ATTORNEY United States Patent Office 2,994,079
Patented July 25, 1961

2,994,079
SIGNAL DISPLAY APPARATUS
Stanley J. Obloy, Kenneth R. Cukras, and Thomas J. Callaghan, Cleveland, Ohio, assignors to Designers for Industry, Cleveland, Ohio, a corporation of Ohio
Filed Dec. 3, 1956, Ser. No. 626,803
10 Claims. (Cl. 343—11)

The present invention relates to a device for displaying contours and particularly to a device for displaying contours representing equal amplitudes in a radiated-signal receiving system. While the invention may be of general utility it is particularly useful in the display of weather information in a weather radar system and will be described in that connection.

As is well known to those skilled in the art, a radar system in which the received signals are displayed in a system of polar coordinates, such as used in a plan position indicator or P.P.I. system, is effective to show storm conditions under some circumstances. In the most simple case the storm area involved is simply shown as an illuminated area shown on the P.P.I. scope. This allows the operator to see all of the areas where any storm conditions exist but such a system is ineffective to distinguish between a very light rain storm and a storm of the most intense variety.

It has been proposed with respect to a weather radar system of the general type under consideration here to display received signals only up to a certain amplitude value and to suppress the signal display for amplitude values above this selected amplitude. Such a system is described in a report relating to work done on a Government contract which is available in the Library of Congress in Washington, D.C., as PB-119619. Such a weather display system has the advantage over the system first described that it is now possible to distinguish areas of very light rainfall from areas of rainfall which are greater than some selected value. However, such a system still leaves much to be desired for the reason that information is displayed only as to storms which are above or below a selected value.

It has further been proposed to display information with respect to a plurality of selected storm intensity values in a system in which the character of the signal display is reversed at each selected value. For example storms of light rain intensity are indicated as a bright area on a cathode ray tube; storms of moderate intensity are simultaneously displayed as a dark area on the cathode ray tube, and heavy storms appear as a bright area on the same cathode ray tube. While such a system has the advantage over that first described that information is displayed with reference to each of several selected storm intensity values, such a system has the disadvantage that the character of the display for storms of a very heavy intensity may be identical with the character of the display for storms of a very light intensity. The disadvantages of a system of this type are readily apparent but will be referred to in more detail hereinafter in connection with the description of the present invention.

It is an object of the present invention to produce a new and improved weather radar display device.

It is another object of the invention to provide a new and improved contour display device.

It is still another object of the invention to provide a device of the type under consideration which uses standard commercial equipment modified to provide a type of display in which intensity contours are shown.

In accordance with the invention a display device comprises a means for transmitting pulses of energy in a plurality of different directions and a means for receiving energy from the pulses which is sent back to the vicinity of the transmitting means by reflectors in the predetermined transmission paths of the pulses which have different reflective properties. In a preferred embodiment of the invention the means for transmitting and receiving pulses is a conventional radar transmitter. The display device of the invention also includes a plan position indicator device or a P.P.I. scope synchronized with the means for transmitting pulses for displaying energy received from the reflectors in a system of polar coordinates and dependent upon the relative position of the reflectors with reference to the transmitting means. In the case of the weather radar system, the reflectors involved can be raindrops, snow, or hail in the path of the transmitted pulses and the transmitted energy can be considered to be reflected from the raindrops, snow or hail in unit volumes which have different effective reflective properties dependent upon the intensity of the storm at the position considered. The device of the invention also includes means for effectively selecting from the received energy only predetermined portions, each of which corresponds to energy received from reflectors of substantially an identical reflective property which is substantially different from the reflective property corresponding to any of the others of the predetermined selected portions. The system of the invention further includes means for utilizing the energy corresponding to each of the above-mentioned selected portions to modify the display of the plan position indicator to produce a contour line on the indicator for each "front" composed of reflectors of the same reflective property which is present in the paths of the transmitted pulses. It will be understood that a rain "front" having substantially the same storm intensity value at all points along its path will effectively comprise a front of reflectors of the same reflective property in a manner which will be described in more detail hereinafter.

For a better understanding of the present invention together with other and further objects thereof reference is had to the following description taken in connection with the accompanying drawings and its scope will be pointed out in the appended claims.

Referring now to the drawings,

FIG. 1 is a block diagram of a weather radar system in accordance with the invention.

Figure 2:
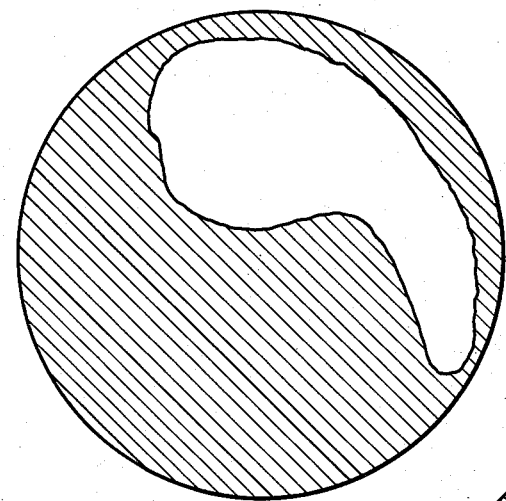
Figure 4:
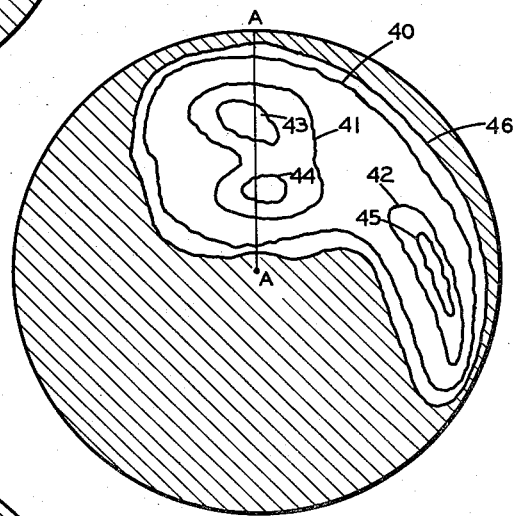
Figure 5:
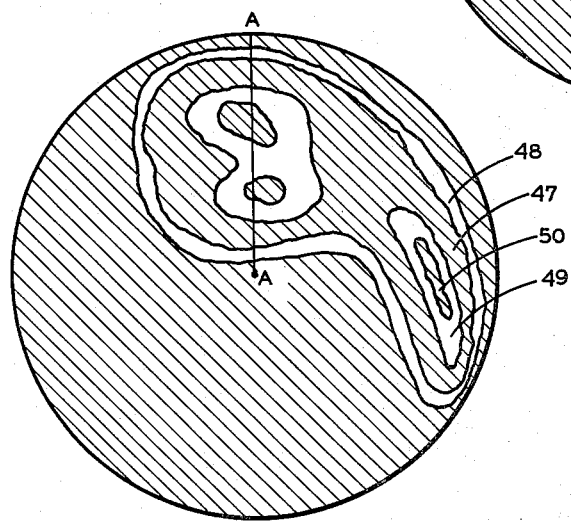
Figure 6:
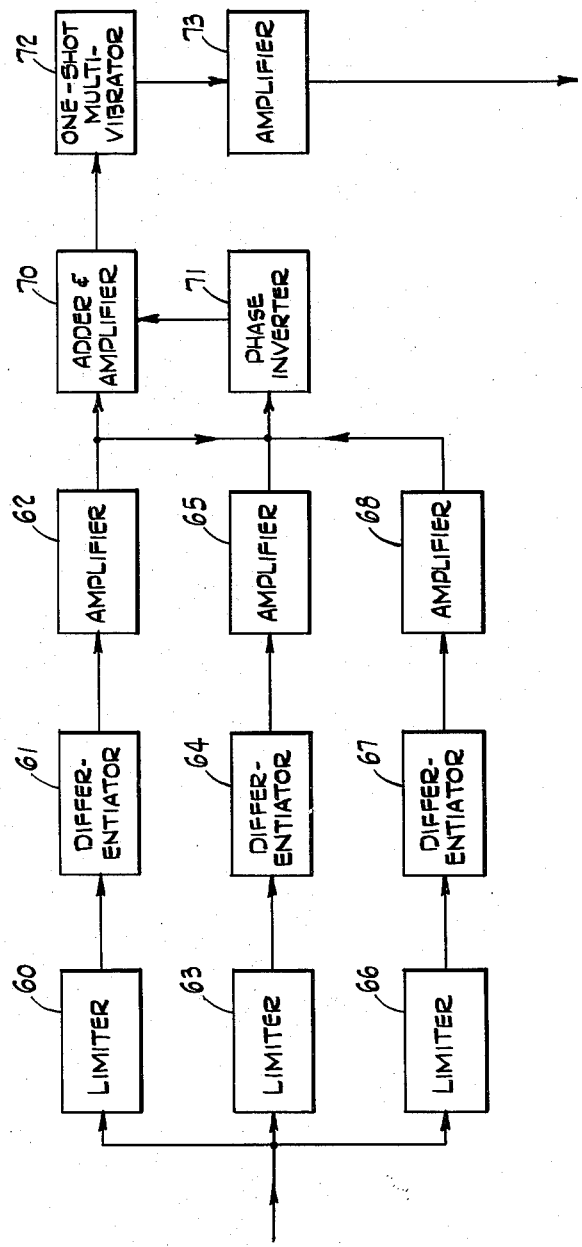

FIG. 2 is a diagram utilized to explain the type of display which is presented by one of the prior art systems, FIG. 3 comprises a series of curves utilized to illustrate the operation of the FIG. 1 embodiment of the invention, FIG. 4 comprises an illustration of the type of display which is provided by the FIG. 1 embodiment of the invention, FIG. 5 illustrates the type of display which is provided by a weather radar device of a type which has been previously proposed, FIG. 6 comprises a block diagram utilized to illustrate another embodiment of the invention, and FIG. 7 comprises curves utilized to explain the FIG. 6 embodiment of the invention.

Referring now to FIGURE 1 of the drawings, there is there illustrated a preferred embodiment of the invention which comprises a radar system effective to transmit pulses of energy and to receive energy from reflectors in the transmission path of the pulses. Thus in FIGURE 1 is shown a transmitter 10 connected to an antenna 11 through a transmit receive switch or T/R switch 12. The antenna 11 is also connected to a receiver through the T/R switch 12 by connection between the T/R switch 12 and a mixer 13. A local oscillator 14 is connected to the mixer 13 for converting the received signal to an intermediate frequency signal which is thereafter amplified in an amplifier 15 and detected in a detector 16. The output of the detector 16 is connected to a video amplifier 17 from which signals are taken into a combination of electronic devices shown within the dotted lines 18, a description of which will be presented in more detail at a later time.

The signal output from video amplifier 17 is fed directly to a mixer 20 and a signal output from the elements shown in block form within the dotted lines 18 is also applied to the mixer 20. The output of the mixer 20 is applied through a video amplifier 21 to a cathode ray tube display device 22. A timing unit 24 is provided for synchronizing the display of the cathode ray tube 22 with the pulses transmitted by the transmitter 10.

A sensitivity time control device 25 is provided to compensate the amplitude of the received signal for the attenuation of the pulse between the time it is transmitted by the antenna 11 and the time when energy from the pulse is reflected back to the antenna 11 by some signal reflector such as raindrops in the transmission path of the pulse.

Considering now the portions of the system within dotted lines 18, there is provided a first signal transmission path or channel No. 1 which includes a limiter 30 and an adder and amplifier 31. A portion of the signal translated by the limiter 30 is also applied to adder and amplifier 31 through an amplifier and phase inverter 32.

Channel No. 1 also includes a multivibrator 36 and a phase inverter and amplifier 37.

There is also provided in the FIG. 1 embodiment a channel No. 2 and a channel No. 3 effectively connected in parallel with the channel No. 1 described above. Channel No. 2 is designated by the reference numeral 33 and channel No. 3 is designated by the reference numeral 34. It will be understood that channel 33, for example, includes a limiter corresponding to limiter 30 and adder and amplifier corresponding to the unit in channel No. 1 designated by the reference numeral 31, an amplifier and phase inverter corresponding to the unit designated by the reference numeral 32 and units corresponding to units 36 and 37 of channel No. 1. Similarly channel No. 3 includes elements corresponding to those designated in channel No. 1 by reference numerals 30, 31, 32, 36 and 37.

The signal outputs of the channels Nos. 1, 2, and 3 are connected to a mixer 20.

Neglecting for the moment the operation of the portion of the system described above which is included within the dotted lines 18 and the function of mixer 20, the system described includes the elements of a conventional radar system such as is used for example in detecting weather fronts. While the operation of such a system is well understood by those skilled in the art for the sake of clarity the operation will be briefly described here. The timing unit 24 keys the transmitter 10 to provide a pulse of energy to antenna 11 through T/R switch 12 which is radiated by the antenna in a direction corresponding to the position of the reflector associated with the antenna. Thus the pulse is radiated over a predetermined transmission path. At the time the pulse from transmitter 10 is supplied to the antenna, the T/R switch 12 effectively blocks the receiving system. Energy received from reflectors in the path of the transmitted pulse is intercepted at some later time by the antenna system 11 and is supplied through the T/R switch to the mixer 13. The switch 12 is such that mixer 13 is conditioned to accept the received energy at the time it is received by a reflector in the path of the transmitted pulse.

The received signal is changed to an intermediate frequncy signal by the action of the local oscillator 14 upon the mixer 13 and the resulting intermediate frequency signal is amplified in amplifier 15 and detected in detector 16. The detected signal is amplified in video amplifier 17 and, neglecting for the moment the elements included within the dotted lines 18 and the mixer 20, is further amplified in the video amplifier 21 after which it is supplied to the input grid of the cathode ray tube of unit 22. The scanning system of cathode ray tube 22 is controlled by the timing unit 24 so that, effectively, a spot is transmitted from the center of the tube along some radius of the tube which corresponds to the direction which the pulse is transmitted by the antenna 11. This spot is deflected radially at a uniform rate and, at sometime thereafter when energy from a reflector in the path of the transmitted pulse is received, this energy is passed through the receiver system just described to control the intensity of the display of the cathode ray tube to indicate the reflector in the path of the transmitted pulse. Thus every effective reflector in the path of the transmitted pulse is indicaed and it will be understood that the process just described is repeated for a great many different directions or orientations so that the display effectively presented by the cathode ray tube indicates the relative position of the reflectors in the path of the transmitted pulses in a system of polar coordinates. Such a display has come to be known as a plan position indicator or P.P.I. display.

Where it is desired to indicate the reflective properties of the reflectors in the path of the transmitted pulses by the amplitude of the received pulses which are returned to the antenna by the reflector, it is necessary to compensate the amplitude of the received signals for the distance the reflector involved is from the antenna. If this were not done strong signals would be received from a reflector close to the antenna and weak signals would be received from a reflector remote from the antenna even though these two reflectors had the same reflective properties. Thus, in the system of FIG. 1, the sensitivity time control device 25 is provided for the purpose of increasing the gain of the receiver system as a function of time after the transmission of each transmitted pulse. The operation of this unit is well understood by those skilled in the radar art.

Coming now to the portion of the system of FIG. 1 involved in the present invention, reference is made to the curves of FIG. 3 for a description of the operation of the system. Curve A indicates the pulse which is transmitted by the antenna 11 at the time $T_1$. For the purpose of the present description, it is assumed that there is a storm present in the path of the transmitted pulse and that the raindrops of the storm have different reflective properties such that the signal returned to the antenna 11 as a result of the transmitted pulse and thereafter detected in detector 16 varies with time as shown in curve B. The dotted lines $E_1$, $E_2$, and $E_3$ represent the clipping levels of the limiters included in channel No. 1, channel No. 2 and channel No. 3 of FIG. 1 respectively. Thus, considering for the moment only the operation of channel No. 1, the limiter 30 is effective to clip the received signal at the amplitude level $E_1$ and to pass to adder and amplifier 31 a signal of the wave form represented in curve C. The upper portion of the signal which is clipped at the amplitude level $E_1$ is transmitted by limiter 30 to the amplifier and phase inverter 32. This signal is represented in FIG. 3 by the curve D which is, in effect, the input signal to amplifier 32. The signal of curve D is reversed in phase in the unit 32 of channel No. 1 and the output signal of unit 32 is thus as represented by the curve E. The two signal inputs to the adder and amplifier 31 are added to provide the curve F of FIG. 3; specifically, the signal represented by the curve C is added to that represented by the curve E to produce the signal F which represents the output signal of the adder and amplifier 31. This output signal is supplied to the multivibrator 36. The multivibrator 36 is of the so-called "one-shot" type and is biased so that an input signal of the amplitude level $E_1$ causes a pulse to be generated by the device. The signal of curve F therefore applied to the multivibrator 36 causes the pulses indicated in curve G to be generated. These pulses are inverted in phase in the unit 37 and applied to the mixer 20. The phase inversion of these signals in the unit 37 is indicated by the curve H.

Coming now to channel No. 2, the signal is as stated above limited in this channel at the amplitude level $E_2$. Thus the signal applied to the adder and amplifier (not shown specifically) of channel No. 2 is represented by the curve I of FIG. 3. Similarly the signal input to the amplifier and phase inverter of channel No. 2 is represented by curve J. The output signal of the amplifier and phase inverter of channel No. 2 is represented by curve K and the input signal to the multivibrator of channel No. 2 corresponding to unit 36 of channel No. 1 is thus as represented by curve L. The curve L is the combination of curve I and curve K in a manner similar to that described in connection with the explanation of the operation of channel No. 1 given above. The pulses generated by the multivibrator in channel No. 2 under the conditions described are represented in curve M. As before, these pulses are inverted in a unit similar to unit 37 and applied to mixer 20. The inverted pulses are shown in curve N.

Coming now to the operation of channel No. 3, the limiting level is, as stated above, at $E_3$. The signal output of the limiter in channel No. 3 which is applied directly to the amplifier of channel No. 3 is thus shown by curve O of FIG. 3. Correspondingly the signal which is applied to the phase inverter of channel No. 3 is shown by the curve P. The output signal of the phase inverter is thus as shown in curve Q. The signal output of the adder and amplifier in channel No. 3 then becomes as represented by curve R under the assumed conditions. Again the signal of channel No. 3 is applied to its multivibrator in such a manner that only the peaks at the level $E_3$ cause a pulse to be generated and these output pulses are then as illustrated in curve S. The pulses of curve S as inverted are represented by curve T.

It will be seen therefore that the pulses of curves H, N and T are applied to the mixer 20 under the assumed conditions. It will also be seen that the output of video amplifier 17 is also applied to the mixer 20. This signal corresponds to the detected component of the received signal as represented by curve B. Therefore the signal resulting from the combination in the mixer 20 is as represented in curve U. This signal corresponds to the demodulation components of the original signal received by the antenna 11 with portions of the signal corresponding to predetermined amplitude levels suppressed.

Reference is now made to FIGURE 4 for an indication of the type of display which can be presented by the display device of the invention. It will be assumed that the antenna of FIG. 1 is oriented along the line AA of FIG. 4 and that the signal represented by curve B of FIG. 3 is received from a pulse reflected in this direction. This means that a rainstorm is present in this direction which effectively includes a plurality of reflectors in the transmission path of the pulse and that these reflectors are effective to return to the vicinity of the transmitting means a portion of the energy of the transmitted pulse. It will also be aparent that the amount of energy returned to the vicinity of the transmitting means by a reflector (composed of a plurality of raindrops) will depend upon the reflective properties of the reflector. A storm area has been indicated in FIGURE 4 which is consistent with the signal indicated in FIG. 3, it being understood that the curves of FIG. 3 only relate to the signal received for the pulse transmission path corresponding to AA of FIG. 4. The shaded areas of this display represent a signal of insufficient intensity to indicate the presence of a reflector in the path of the transmitted pulses. That is the shaded area indicates an area where no storm is present. If it were not for the fact that certain portions of the signal are suppressed as indicated in curve U of FIG. 3, the storm area under consideration would be represented by a large illuminated area on the tube as indicated in FIG. 2. However, when the specific amplitude values of the signal are suppressed, which amplitude values correspond to energy received from reflectors of substantially an identical reflective property, a contour line such as the contour line 40 of FIG. 4 is produced on the display. The contour line 40 corresponds to the received signal level $E_1$ in the limiter 30 of FIG. 1. The reflective properties corresponding to the other predetermined amplitude portions of the received signal which have been selected to produce contour lines are substantially different from those which produce contour line 40. Thus contour lines are produced for each such amplitude level. Thus the contour lines 41 and 42 correspond to the amplitude level $E_2$ as the input signal is applied to channel No. 2. Similarly the contour lines 43, 44 and 45 correspond to the amplitude level of the signal $E_3$ as applied to channel No. 3.

It will be seen therefore that the system of FIG. 1 is effective to display the storm under the assumed conditions with a system of contour lines superposed thereon corresponding to three different storm-intensity levels. These contour lines then become similar to the contour lines upon a topographic map. Thus it will be apparent that the contour line 40 represents a front composed of reflectors of the substantially same reflective properties in the storm or represents a line of constant rain intensity in the storm. The rain intensity along this line corresponds to the signal level $E_1$ of FIG. 3. Similarly it follows therefore that the areas within the contour lines 43, 44 and 45 are areas of very great storm intensity. It is also apparent that, with this display available for an airline pilot, he could readily determine that the airplane could be taken between the areas of high storm intensity within the contour lines 44 and 45, whereas the plane in continuing along the line AA might be subjected to very great hazards.

In FIG. 5 is shown the type of display which is presented by Atlas Patent 2,656,531, mentioned above, and assuming that the storm conditions are identical with those represented in FIG. 4. In this case, storms of very light or no rain intensity are shown as a dark area, for example, the area represented by the general background of the storm display or the area outside of the light area 48. Storms of moderate intensity are also displayed as a dark area, for example, area 47 surrounded by the single bright band 48. Heavier storms appear as a bright core as represented by the area 49 and very heavy storms appear as a dark core as represented by the area 50. It is thus apparent that, in the display of FIG. 5, rainstorms of very great intensity appear upon the scope exactly as the areas where there is no rain whatever present. For example, consider the area 50 in the FIG. 5 display as contrasted with the general background area where no storm is present. It is seen therefore that the display of FIG. 4 presents a very much easier display for a pilot to read and that areas of great rain intensity can easily be avoided.

It will be apparent from a consideration of the FIG. 1 embodiment of the invention and the description which has just been given that, if the direct connection between video amplifier 17 and the mixer 20 is omitted, only the pulses represented by curves H, N and T will be applied to the grid of the cathode ray tube. If the background level of the tube is set so that these pulses cause a modification in the background display, only the contour lines 40–45, inclusive, of FIG. 4 will be shown. It will also be apparent that these pulses can be supplied to the cathode ray tube 22 either to increase the intensity of the display or to decrease the intensity of the display and that in either case the contour lines only will be shown. In the case where the intensity of the cathode ray beam is increased by the pulses, the contour lines will be shown as bright lines on a darker background. Conversely, where the intensity of the cathode ray beam is decreased, the contour lines will be shown as black lines on a lighter background.

It will thus be seen that the FIG. 1 embodiment of the invention comprises a plan position indicator device or P.P.I. scope synchronized with the means for transmitting pulses for displaying energy received from reflectors in the path of the pulses in a system of polar coordinates. It will also be apparent that the elements 30, 31, and 32 are included in a means for selecting from the received energy only predetermined portions, namely portions corresponding to a signal amplitude level $E_1$ or portions corresponding to energy received from reflectors in the path of the transmitted pulse of substantially an identical reflective property. It will be apparent also that the elements of channel 2 and the elements of channel 3 are each included in a similar means for selecting only predetermined portions of the received energy, each of which portions again corresponds to energy received from reflectors of substantially an identical effective reflective property. It will be apparent that the energy selected by the respective channels 1, 2 and 3 of FIG. 1 corresponds to effective reflective properties in the path of the transmitted signal which are substantially different in each case. That is, the effective reflective properties corresponding to channel No. 1 are substantially different from the effective reflective properties corresponding to channel No. 2 or channel No. 3. It will be seen, for example, that the energy selected by channel No. 1 is ultimately used to modify the display of the cathode ray tube 22 to produce a contour line on the indicator, specifically the contour line 40 of FIG. 4. It will further be apparent that this contour line corresponds to a front of reflectors of substantially the same reflective property, which front is present in the reflective paths of the consecutively transmitted pulses from antenna system 11.

In FIG. 6 there is shown another modification of the invention which may be substituted in its entirety for the portions of the FIG. 1 circuit included within the dotted lines 18. The circuit of FIG. 6 again includes three channels for dealing with three different amplitude levels of the video signal from amplifier 17. One of these channels includes a limiter 60, a differentiator 61 and an amplifier 62. Another of the channels includes a limiter 63, also having an input circuit connected to video amplifier 17, a differentiator 64 and an amplifier 65. The third of the channels includes a limiter 66, a differentiator 67 and an amplifier 68. The output of the amplifiers 62, 65 and 68 are each coupled to an adder and amplifier 70 and to a phase inverter 71. The adder and amplifier 70 is designed to be responsive to a negative input pulse for producing a positive output pulse. The phase inverter 71 is designed to invert the phase of positive signals applied thereto and to supply to adder and amplifier 70 a negative input pulse for each positive pulse applied to the input circuit of phase inverter 71. The output circuit of adder and amplifier 70 is connected to a one-shot multivibrator or to a univibrator 72. The pulses generated by the multivibrator 72 are amplified in an amplifier 73, the output circuit of which is adapted to be connected to the mixer 20 of FIG. 1.

Reference is made to FIG. 7 for a description of the operation of the circuit of FIG. 6. In this figure the curve AA is identical to the curve A of FIG. 3 and again represents an output pulse from the transmitter at the time $T_1$. Similarly curve BB represents the detected component of the energy received from the transmitted pulse from reflectors in the transmission path of the pulse. There are shown on the curve BB three amplitude levels $E_1$, $E_2$, and $E_3$ corresponding to the amplitude levels at which the limiters 60, 63 and 66 of FIG. 6 operate. The curve CC represents the output signal of limiter 60. In order to provide an output signal of this character, the limiter 60 is designed so that it contains a vacuum tube which is biased beyond its cut-off point until signal amplitude values very close to the signal level $E_1$ are applied to it. The design is also such that the signal translated by the limiter 60 is sharply limited with respect to signal amplitude values above the amplitude level $E_1$. The signal output of the limiter 60 thus is substantially as represented by the curve CC. The differentiators 61 produce the two pulses shown in curve DD in response to the broad input pulse just mentioned. Similarly the signal output of limiter 63, for the assumed conditions, is represented by the curve EE. The differentiator 64 produce a positive and a negative pulse in response to this signal input as represented by the curve FF. In curve GG is shown the signal output of limiter 66 under the assumed conditions. It will be seen that there are effectively two square pulses corresponding to the two peak portions of the reflected signal indicated in curve BB. The differentiator 67 produces from the input signal represented by curve GG the output pulses illustrated in curve HH.

As stated above the phase inverter 71 is responsive only to positive pulses and generates for each positive pulse applied to it a corresponding negative pulse. The positive pulses applied to phase inverter 71 under the conditions assumed are represented in curve II. These positive pulses are derived from the positive pulses of curves DD, FF and curve HH. They are all shown as of the same amplitude for the reason that the amplifiers 62, 65 and 68 are so designed as to produce output pulses of substantially uniform amplitude. Since the only function of phase inverter 71 is to reverse the phase of positive pulses applied to it, the curve II if considered to represent pulses of negative polarity also represents the signal output of phase inverter 71 which is applied to adder and amplifier 70. The negative pulses which are applied to adder and amplifier 70 directly from amplifiers 62, 65 and 68 are represented in curve JJ. These pulses correspond to the negative pulses of curves DD, FF, and HH all brought to a common amplitude level by the action of amplifiers 62, 65 and 68. The negative input signals to the adder and amplifier 70 thus comprise the pulses represented in curve II and the pulses represented in curve JJ and are shown in curve KK. These pulses are effectively reversed in polarity in adder and amplifier 70 and applied to the one-shot multivibrator 72 to generate corresponding short output pulses which are amplified and reverse in polarity in amplifier 73 to provide an output for the FIG. 6 circuit under the assumed condition as represented in curve LL. If the circuit of FIG. 6 is now considered to be substituted for the portions of the FIG. 1 circuit within the dotted lines 18, it will be seen that the negative pulses of curve LL are applied to the mixer 20 and that there is also applied to the mixer 20 the signal output from video amplifier 17. The output signal of the mixer 20 again becomes that represented in curve MM which is identical to the signal output which is derived from the circuit within the dotted lines 18 of FIG. 1.

Thus the display produced in the cathode ray tube for the FIG. 6 embodiment is identical to that produced by the FIG. 1 embodiment and, for the storm conditions assumed for the purpose of illustration here, is as represented in FIG. 4.

As pointed out above this display has the advantage of showing narrow contour lines representing lines of equal storm intensity and areas within contour lines representing high storm intensities are never shown in the same shade on the display device as other areas which may represent zero storm intensity. Thus there is much less likelihood that a navigator of a plane using a weather radar of the type described herein will inadvertently choose a path of high storm intensity simply because the display has been misread due to its confusing nature.

While there have been described what are at present considered to be the preferred embodiments of this invention it will be obvious to those skilled in the art that various changes and modifications may be made therein without departing from the invention and it is therefore aimed in the appended claims to cover all such changes and modifications as fall within the true spirit and scope of the invention.

What is claimed is:

1. A contour display device comprising: means for sequentially transmitting a pulse of energy in each of a plurality of different predetermined directions; means for receiving energy from said pulses which is sent back to the vicinity of said transmitting means during a predetermined time interval following each tranmitted pulse by reflectors which are in the predetermined transmission paths of said pulses and which reflectors have different reflective properties; a plan position indicator device synchronized with said means for transmitting pulses for displaying energy received from said reflectors in a system of polar coordinates; means for effectively selecting energy from said received energy only at certain predetermined intervals which are very short with reference to said predetermined time interval, each of said selected predetermined short intervals corresponding to the time during which energy is received from reflectors of substantially an identical reflective property which is substantially different from the reflective property corresponding to any of the others of said reflectors; and means for utilizing the selected energy to modify the display of said indicator to produce a very narrow contour line against a substantially uniform background on said indicator for each front composed of reflectors of said same reflective property which is present in the paths of said transmitted pulses.

2. A contour display device comprising: means for sequentially transmitting a pulse of energy in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties; a plan position indicator device synchronized with said means for transmitting pulses for displaying energy received from said reflectors in a system of polar coordinates and dependent upon the relative positions of said reflectors with reference to said transmitting means; means for effectively selecting energy from said received energy only at certain predetermined intervals which are very short with reference to said predetermined time intervals, each of said selected predetermined short intervals corresponding to the time during which energy is received from reflectors of substantially an identical reflective property which is substantially different from the reflective property corresponding to any of the others of said reflectors; and means for utilizing the selected energy to modify the display of said indicator to produce a very narrow contour line against a substantially uniform background on said indicator for each front composed of reflectors of said same reflective property which is present in the paths of said transmitted pulses.

3. A contour display device comprising: means for sequentially transmitting a pulse of radio-frequency energy in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties; a plan position indicator device synchronized with said means for transmitting pulses for displaying energy received from said reflectors in a system of polar coordinates and dependent upon the relative positions of said reflectors with reference to said transmitting means; means for effectively selecting energy from said received energy only at certain predetermined intervals which are very short with reference to said predetermiend time intervals, each of said selected predetermined short intervals corresponding to the time during which energy is received from reflectors of substantially an identical reflective property which is substantially different from the reflective property corresponding to any of the others of said reflectors; and means for utilizing the selected energy to modify the display of said indicator to produce a very narrow contour line against a substantially uniform background on said indicator for each front composed of reflectors of said same reflective property which is present in the paths of said transmitted pulses.

4. A contour display device comprising: means for sequentially transmitting a pulse of radio-frequency energy of a wavelength within the range of one half to fifteen centimeters in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties; a plan position indicator device synchronized with said means for transmitting pulses for displaying energy received from said reflectors in a system of polar coordinates and dependent upon the relative positions of said reflectors with reference to said transmitting means; means for effectively selecting energy from said received energy only at certain predetermined intervals which are very short with reference to said predetermined time interval, each of said selected predetermined short intervals corresponding to the time during which energy is received from reflectors of substantially an identical reflective property which is substantially different from the reflective property corresponding to any of the others of said reflectors; and means for utilizing the selected energy to modify the display of said indicator to produce a very narrow contour line against a substantially uniform background on said indicator for each front composed of reflectors of said same reflective property which is present in the paths of said transmitted pulses.

5. A contour display device comprising: means for sequentially transmitting a pulse of energy in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties and for adjusting the amplitude of the received signals to compensate for the range attenuation of the signal in the path from the transmitting means to the reflector and in the return path from the reflector to the receiving means; a plan position indicator device synchronized with said means for transmitting pulses for displaying energy received from said reflectors in a system of polar coordinates and dependent upon the relative positions of said reflectors with reference to said transmitting means; means for effectively selecting energy from said received energy only at certain predetermined intervals which are very short with reference to said predetermined time intervals, each of said selected predetermined short intervals corresponding to the time during which energy is received from reflectors of substantially an identical reflective property which is substantially different from the reflective property corresponding to any of the others of said reflectors; and means for utilizing the selected energy to modify the display of said indicator to produce a very narrow contour line against a substantially uniform background on said indicator for each front composed of reflectors of said same reflective property which is present in the paths of said transmitted pulses.

6. A contour display device comprising: means for sequentially transmitting a pulse of energy in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties and for adjusting the amplitude of the received signal to compensate for the attenuation of the signal in the path from the transmitting means to the reflector and in the return path from the reflector to the receiving means; a plan position indicator device synchronized with said means for transmitting pulses for displaying energy received from said reflectors in a system of polar coordinates and dependent upon the relative positions of said reflectors with reference to said transmitting means; amplitude selective means for effectively selecting energy from said received energy only at intervals which are very short with reference to said predetermined time intervals corresponding to certain predetermined amplitude portions, each of said selected predetermined amplitude portions corresponding to the time during which energy is received from reflectors of substantially an identical reflective property which is substantially different from the reflective property corresponding to any of the others of said reflectors; and means for utilizing the selected energy to modify the display of said indicator to produce a very narrow contour line against a substantially uniform background on said indicator for each front composed of reflectors of said same reflective property which is present in the paths of said transmitted pulses.

7. A contour display device comprising: means for sequentially transmitting a pulse of energy in each of a plurality of different predetermined directions; means for receiving energy from said pulses which is sent back to the vicinity of said transmitting means by reflectors which are in the predetermined transmission paths of said pulses and which reflectors have different reflective properties; a plan position indicator device synchronized with said means for transmitting pulses for displaying energy received from said reflectors in a system of polar coordinates; means for effectively dividing said received signal into two portions about each of a plurality of preselected amplitude levels, each of said predetermined amplitude levels of the signal corresponding to the time energy is received from reflectors of substantially an identical reflective property which is substantially different from the reflective property corresponding to any of the others of said reflectors; means for adding with opposite polarity the two received signal portions corresponding to each of said selected signal amplitude levels; and means for utilizing the peak portions of said added signals to modify the display of said indicator to produce a very narrow contour line against a substantially uniform background on said indicator for each front corresponding to each of said selected amplitude levels and composed of reflectors of said same reflective property which is present in the path of said transmitted pulses.

8. A contour display device comprising: means for sequentially transmitting a pulse of energy in each of a plurality of different predetermined directions; means for receiving energy from said pulses which is sent back to the vicinity of said transmitting means by reflectors which are in the predetermined transmission paths of said pulses and which reflectors have different reflective properties; a plan position indicator device synchronized with said means for transmitting pulses for displaying energy received from said reflectors in a system of polar coordinates; means for limiting the signal received at a plurality of different predetermined amplitude levels, each of said predetermined amplitude levels corresponding to that at which energy is received from reflectors of substantially an identical reflective property which is substantially different from the reflective property corresponding to any of the others of said reflectors; means for differentiating said limited signals to provide a sharp pulse corresponding in time to received signal values of said different amplitude levels; and means for utilizing said sharp pulses to modify the display of said indicator to produce a very narrow contour line against a substantially uniform background on said indicator for each front corresponding to said different amplitude levels and composed of reflectors of said same reflective property which are present in the paths of said transmitted pulses.

9. A contour display device comprising: means for sequentially transmitting a pulse of energy in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties; a plan position indicator device synchronized with said means for transmitting pulses for displaying energy received from said reflectors in a system of polar coordinates and dependent upon the relative positions of said reflectors with reference to said transmitting means; means for effectively selecting energy from said received energy only at certain predetermined intervals which are very short with reference to said predetermined time intervals, each of said predetermined short intervals corresponding to the time during which energy is received from reflectors of substantially an identical reflective property which is substantially different from the reflective property corresponding to any of the others of said reflectors; and means for utilizing the selected energy for changing the intensity of the display of said indicator to produce a narrow contour line against a substantially uniform background on said indicator for each front composed of reflectors of said same reflective property which is present in the paths of said transmitted pulses.

10. A contour display device comprising: means for sequentially transmitting a pulse of energy in each of a plurality of different predetermined directions; means for receiving energy from said pulses which is sent back to the vicinity of said transmitting means during a predetermined time interval following each transmitted pulse by reflectors which are in the predetermined transmission paths of said pulses and which reflectors have different reflective properties; a plan position indicator device synchronized with said means for transmitting pulses for displaying energy deceived from said reflectors in a system of polar coordinates and dependent upon the relative positions of said reflectors with reference to said transmitting means; means for effectively selecting energy from said received energy only at certain predetermined intervals which are very short with reference to said predetermined time interval, each of said predetermined short intervals corresponding to the time during which energy is received from reflectors of substantially an identical reflective property which is substantially different from the reflective property corresponding to any of the others of said reflectors, and means for utilizing the selected energy to decrease the display of said indicator to produce a narrow dark contour line against a substantially uniform background on said indicator for each front composed of reflectors of said same reflective property which is present in the paths of said transmitted pulses.

References Cited in the file of this patent

UNITED STATES PATENTS

| | | |
|---|---|---|
| 2,656,531 | Atlas | Oct. 20, 1953 |
| 2,786,993 | Reid | Mar. 26, 1957 |
| 2,859,437 | Atlas | Nov. 4, 1958 |
| 2,911,640 | Atlas | Nov. 3, 1959 |